United States Patent
Mungre et al.

(10) Patent No.: US 11,288,391 B2
(45) Date of Patent: Mar. 29, 2022

(54) FILENAME-BASED MALWARE PRE-SCANNING

(71) Applicant: EMC IP Holding Company LLC, Hopkinton, MA (US)

(72) Inventors: Avadut Mungre, North Goa (IN); Jai Prakash Gahlot, Pune (IN); Shiv Shankar Kumar, Kumar (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 126 days.

(21) Appl. No.: 16/570,909

(22) Filed: Sep. 13, 2019

(65) Prior Publication Data
US 2021/0081555 A1    Mar. 18, 2021

(51) Int. Cl.
*G06F 21/56* (2013.01)
*G06F 21/62* (2013.01)

(52) U.S. Cl.
CPC ........ *G06F 21/6218* (2013.01); *G06F 21/564* (2013.01); *G06F 21/565* (2013.01); *G06F 21/566* (2013.01); *G06F 21/568* (2013.01); *G06F 21/56* (2013.01)

(58) Field of Classification Search
CPC .. G06F 21/6218; G06F 21/564; G06F 21/565; G06F 21/566; G06F 21/568; G06F 21/62; G06F 21/56
See application file for complete search history.

(56) References Cited

U.S. PATENT DOCUMENTS

| | | | |
|---|---|---|---|
| 7,591,019 B1 | 9/2009 | Sobko et al. | |
| 7,971,258 B1 | 6/2011 | Liao et al. | |
| 7,984,503 B2 | 7/2011 | Edwards | |
| 8,938,806 B1* | 1/2015 | Claudatos | G06F 21/568 726/24 |
| 9,110,920 B1 | 8/2015 | Amegadzie et al. | |
| 9,154,511 B1* | 10/2015 | Rihn | H04L 63/1425 |
| 9,819,695 B2* | 11/2017 | Song | G06F 21/56 |
| 2004/0158730 A1 | 8/2004 | Sarkar | |
| 2005/0149749 A1* | 7/2005 | Van Brabant | G06F 21/564 726/24 |
| 2011/0219450 A1* | 9/2011 | McDougal | H04L 63/1416 726/23 |
| 2012/0297486 A1 | 11/2012 | Turbin | |

(Continued)

OTHER PUBLICATIONS

Non Final office action received for U.S. Appl. No. 16/570,890 dated Apr. 1, 2021, 30 pages.

(Continued)

*Primary Examiner* — Jayesh M Jhaveri
(74) *Attorney, Agent, or Firm* — Amin, Turocy & Watson, LLP

(57) ABSTRACT

Filename-based malware pre-scanning is described herein. A method as described herein can include obtaining, by a device operatively coupled to a processor, a malware scan request for a first file in a directory of a file system, the first file having a first filename belonging to a filename sequence; appending, by the device, the first file to a first malware scan queue; and appending, by the device, respective second files in the directory to a second malware scan queue that is distinct from the first malware scan queue, wherein the respective second files are distinct from the first file and have respective second filenames belonging to the filename sequence.

20 Claims, 16 Drawing Sheets

(56) References Cited

U.S. PATENT DOCUMENTS

| | | | |
|---|---|---|---|
| 2014/0059687 A1* | 2/2014 | Coronado | G06F 21/562 726/24 |
| 2014/0090062 A1* | 3/2014 | Guo | G06F 21/562 726/24 |
| 2014/0366138 A1 | 12/2014 | Zou et al. | |
| 2015/0286437 A1* | 10/2015 | Coronado | G06F 3/0619 711/162 |

OTHER PUBLICATIONS

Notice of Allowance received for U.S. Appl. No. 16/570,890 dated Aug. 19, 2021, 31 pages.

* cited by examiner

FILENAME-BASED MALWARE PRE-SCANNING

TECHNICAL FIELD

The subject application is related to data storage, and more particularly, to techniques for managing data security in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. In addition to providing a means for storing data, an NAS platform can implement one or more data security and/or protection techniques to ensure the integrity of data stored on the platform. For instance, an NAS platform can perform and/or manage scanning of respective files stored on the platform for viruses or other forms of malware according to one or more scanning policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system can include a memory that stores executable components and a processor that executes the executable components stored in the memory. The executable components can include a scan initiator component that receives a malware scan request for a first file in a directory of a file system associated with the data storage system, where the first file has a first filename that is associated with a filename sequence, a scan queue component that adds the first file to a first malware scan queue, and a pre-scan queue component that adds respective second files in the directory that are distinct from the first file and have respective second filenames that are associated with the filename sequence to a second malware scan queue that is distinct from the first malware scan queue.

In another aspect, a method is described herein. The method can include obtaining, by a device operatively coupled to a processor, a malware scan request for a first file in a directory of a file system, the first file having a first filename belonging to a filename sequence, appending, by the device, the first file to a first malware scan queue, and appending, by the device, respective second files in the directory to a second malware scan queue that is distinct from the first malware scan queue, where the respective second files are distinct from the first file and have respective second filenames belonging to the filename sequence.

In an additional aspect, a machine-readable medium including executable instructions is described herein. The instructions, when executed by a processor of a data storage system, can facilitate performance of operations including receiving a malware scan request for a first file in a directory of a file system of the data storage system, the first file having a first filename associated with a filename sequence, queueing the first file in a first scan queue, and queueing respective second files in the directory in a second scan queue that is distinct from the first scan queue, where the respective second files are distinct from the first file and have respective second filenames associated with the filename sequence.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
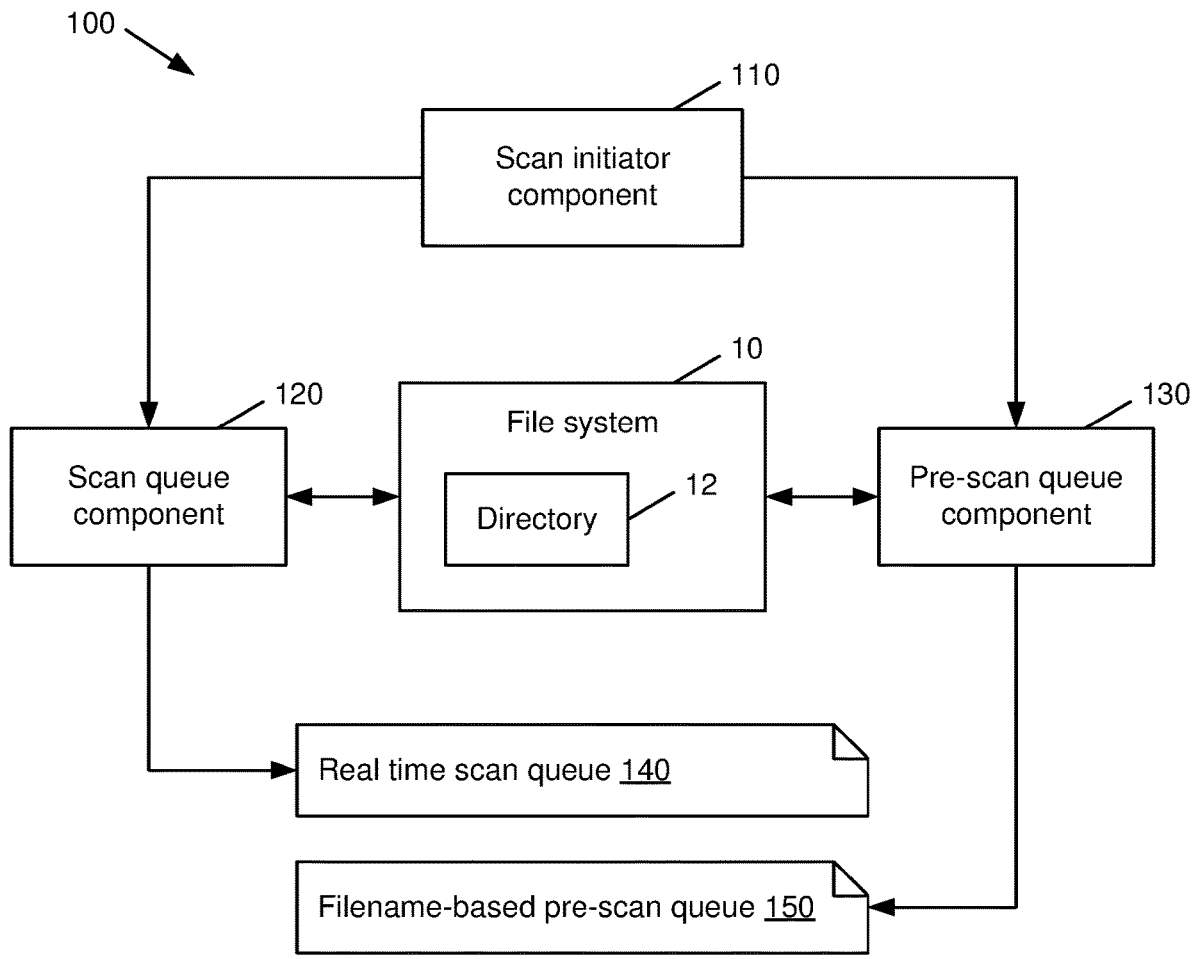
FIG. 1 is a block diagram of a system that facilitates filename-based malware pre-scanning in a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for unstructured data, which can provide a functionally unlimited amount of storage space for multiple users via a seamless single volume and a single file system. In the case of applications and/or workflows that generate very large amounts of data, this data can be broken up into multiple smaller files in order to improve the ability of the system to transfer, process, and/or otherwise manage the data. By way of example, an application or workflow can generate a series of files that are named according to a numerical sequence. These files can then be read by the same application and/or another application in the same sequence. The use of a sequential naming convention in this manner is often associated with image and/or video sequences in media/entertainment content creation/consumption, among other use cases.

In another aspect, an NAS system and/or other data storage system can operate in combination with an external antivirus server (AVS) in order to prevent files infected with viruses or other malware from entering or residing in storage. For instance, files stored and/or accessed in an NAS system can be scanned (e.g., in real time, according to a schedule or direct administrative command, etc.) for viruses or other malware by an external AVS.

For real time scanning, a file can be scanned for viruses or other malware when the file is opened (e.g., scan on read/open), modified (e.g., scan on write), and/or at other times. If a large number of files are to be opened and/or modified in a system that utilizes real time scanning, respective file reads are delayed until the respective files are scanned by the AVS. This, in turn, can result in file access delays experienced by client users of the system as well as reduced AVS throughput.

In view of at least the foregoing, various aspects described herein can facilitate advance scanning of respective files in a filename sequence. For instance, in the case of a workload that accesses files sequentially by filename, when a file is accessed and sent for malware scanning, additional files in the filename sequence can also be sent for malware scanning. As a result, if access to those additional files is subsequently requested, the requested access can be provided without further delay associated with scanning the files.

Various embodiments described herein can provide one or more benefits that improve the functionality of an NAS system and/or an associated AVS. A non-exhaustive list of such benefits is as follows. File access delays associated with on-demand malware scanning can be significantly reduced. AVS throughput can be increased by utilizing otherwise idle AVS resources for pre-scanning stored files. Computing resources (e.g., processor cycles, network bandwidth, power consumption, etc.) associated with scheduled and/or real time malware scans can be reduced. Other benefits that result in improvements to the operation of an NAS system and/or an associated AVS are also possible.

With reference now to the drawings, FIG. 1 illustrates a system 100 that facilitates filename-based malware pre-scanning in accordance with various aspects described herein. As shown in FIG. 1, system 100 includes a scan initiator component 110 that can receive a malware scan request for a file in a directory 12 of a file system 10 associated with system 100. In an aspect, the malware scan request can be initiated by any suitable source, such as a client system connected to or otherwise associated with system 100.

System 100 as shown in FIG. 1 further includes a scan queue component 120 that can, in response to receiving the malware scan request via the scan initiator component 110, add the requested file to a first scan queue, such as a real time scan queue 140 and/or another suitable scan queue. In the event that the requested file is part of a file sequence, e.g., the requested file has a filename that belongs to and/or is otherwise associated with a filename sequence, malware pre-scans for additional files associated with the filename sequence can also be initiated. For instance, as shown in FIG. 1, system 100 further includes a pre-scan queue component that adds respective other files in the directory 12 that also have filenames in the filename sequence to a second scan queue that is different from the first scan queue, e.g., a filename-based pre-scan queue 150.

In an aspect, the pre-scan queue component 130 shown in FIG. 1 can be utilized to facilitate malware pre-scanning for respective files according to filename sequences and/or other criteria. As used herein, pre-scanning refers to scanning and/or otherwise checking a file for malware prior to an explicit request to scan the file being received, e.g., pursuant to a real time scan policy or a scan schedule. By scanning subsequent files in a sequence when an earlier file in the sequence is requested, access delays for the subsequent files can be significantly reduced due to scanning of those files already having occurred prior to access.

Figure 2:
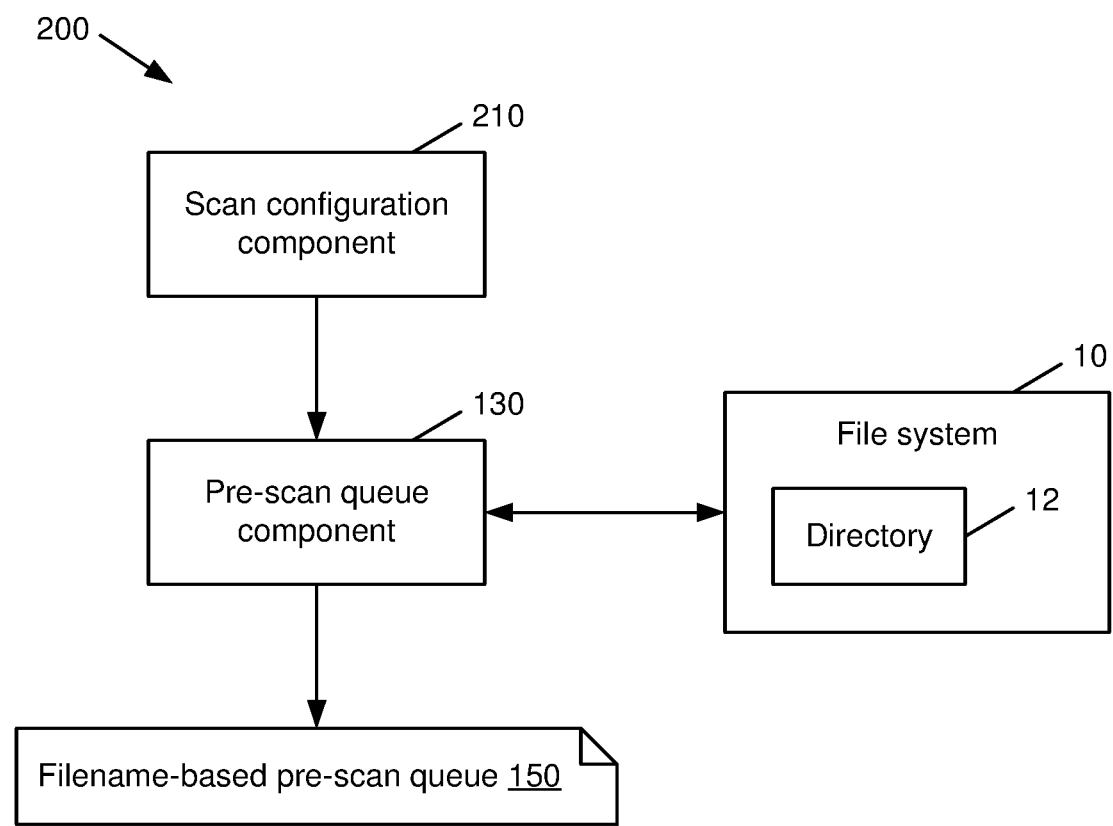
FIG. 2 is a block diagram of a system that facilitates configuration of a file system directory for filename-based malware pre-scanning in a data storage system in accordance with various aspects described herein.

In an aspect, sequential malware scanning as described herein can be enabled or disabled on a per-directory basis. System 200 in FIG. 2 illustrates an example system that facilitates configuration of a file system directory for filename-based malware pre-scanning in a data storage system in accordance with various aspects described herein. Repetitive description of like elements employed in other embodiments described herein is omitted for brevity. System 200 as shown in FIG. 2 includes a scan configuration component 210 that can configure one or more directories 12 for malware pre-scanning. In response to determining that a given directory 12 has been configured for malware pre-scanning, the pre-scan queue component 130 can add respective files in the directory 12 to the filename-based pre-scan queue 150 as described above with respect to FIG. 1.

In an aspect, sequential scanning can be enabled or disabled for a given directory 12 by the scan configuration component 210 as part of an initial scan task configuration. For instance, sequential scanning can be enabled manually (e.g., by a system administrator or other user) and/or automatically when malware scan tasks and/or scan policies associated with the file system 10 are defined or modified.

Figure 3:
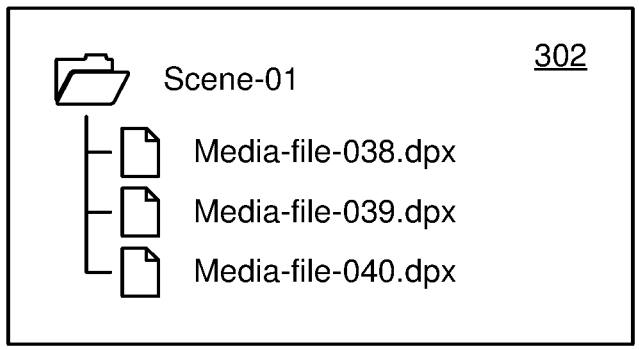
FIG. 3 is a diagram depicting respective file system directories that can be processed by respective malware scanning techniques in accordance with various aspects described herein.
Figure 3:
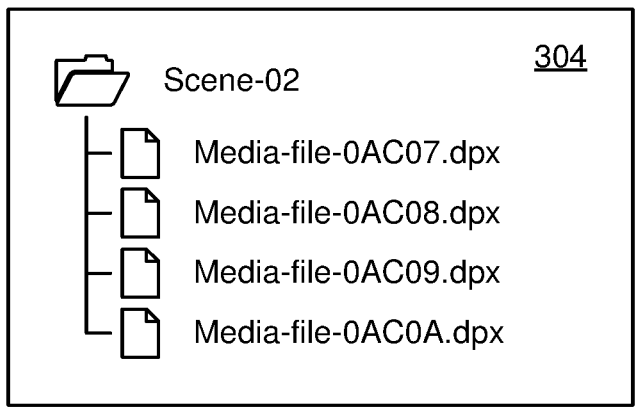
Figure 3:
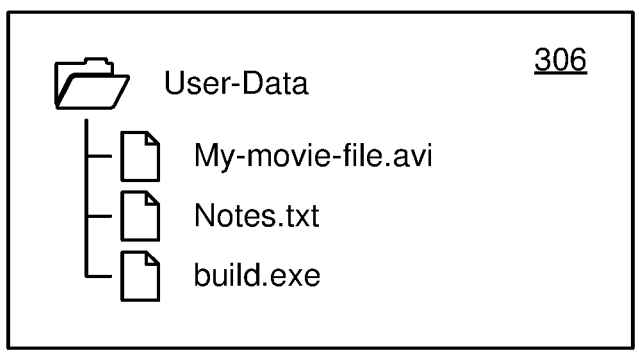

In another aspect, the scan configuration component 210 can analyze names of respective files in a given directory and recommend and/or automatically enable sequential malware pre-scanning for the directory in response to determining that sequential files exist in the directory. For instance, with further reference to diagram 300 in FIG. 3, the scan configuration component 210 can recommend or enable sequential scanning for directory 302 (named "Scene-01" in diagram 300) since directory 302 contains sequentially named files, e.g., "Media-file-038.dpx," "Media-file-039.dpx," and so on.

While directory 302 shows files named sequentially according to a decimal numbering system, other sequences could also be used. For instance, the scan configuration component 210 could similarly recommend or enable sequential scanning for directory 304 (named "Scene-02" in diagram 300) based on files that are named according to a hexadecimal sequence, e.g., "Media-file-0AC07.dpx" through "Media-file-0AC0A.dpx" and so on. Other numerical sequences, such as octal or binary sequences and/or any sequence using any other suitable numeric base could also be used. Additionally, while various aspects are shown and described herein in relation to numeric sequences, any other sequences, such as alphabetical sequences ("FileA," "FileB," "FileC," etc.) or the like, could also be used without departing from the subject matter claimed and described herein.

In contrast to directories 302 and 304 shown in diagram 300, the scan configuration component 210 can disable or otherwise decline to recommend sequential scanning for a directory that does not contain sequential files, such as directory 306 (named "User-Data" in diagram 300). Sequential malware pre-scanning could nonetheless be enabled for directory 306; however, pre-scanning in such a case would be performed only for sequentially named files found in the directory.

Figure 4:
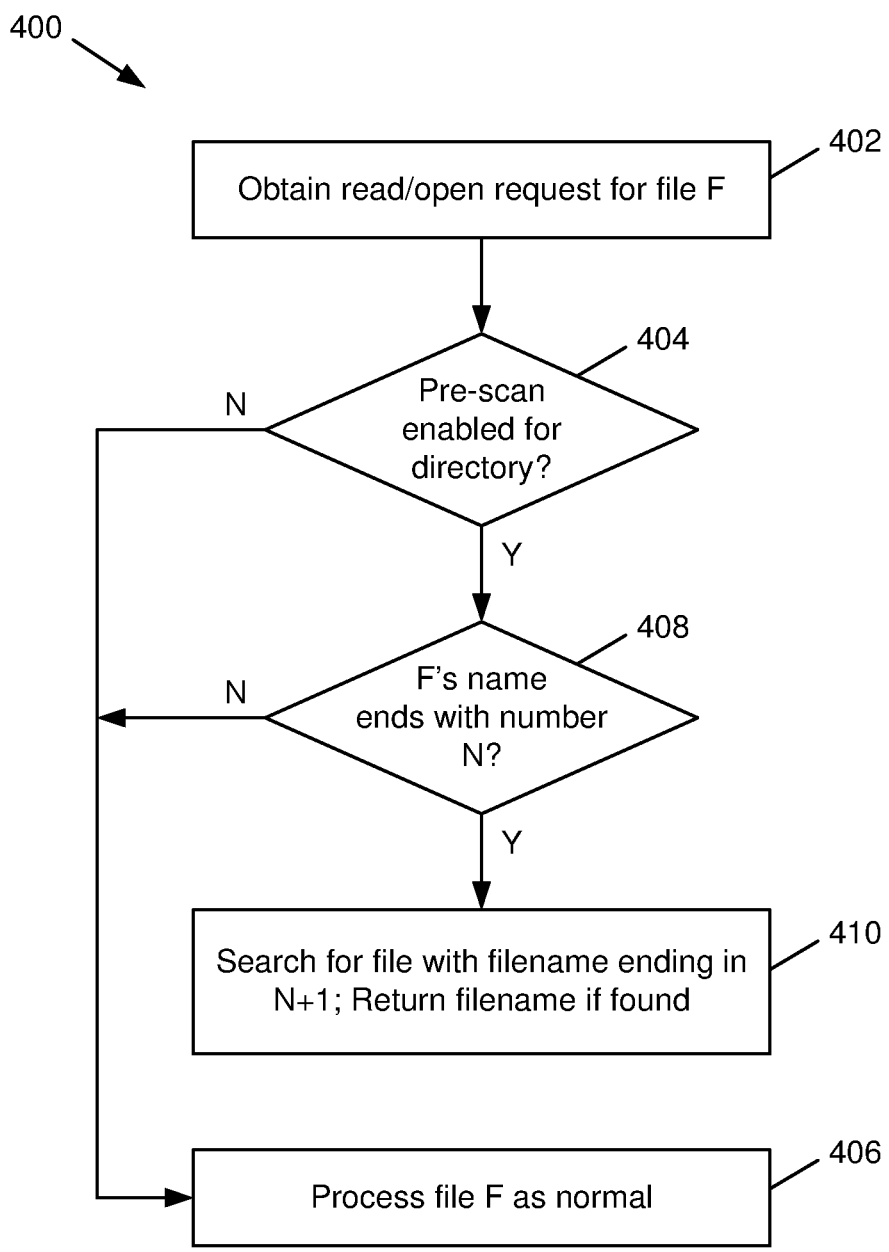
FIG. 4 is a flow diagram of a method for identifying files associated with a filename sequence in accordance with various aspects described herein.
Figure 5:
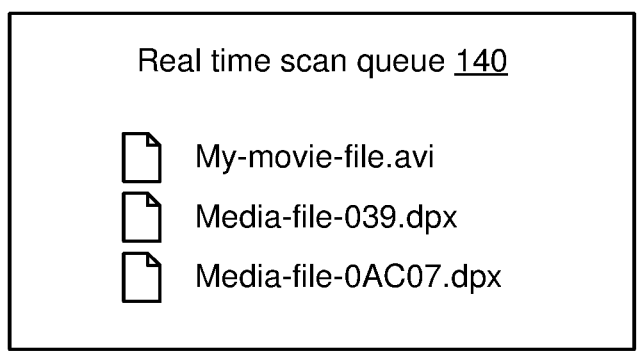
FIG. 5 is a diagram depicting respective malware scan queues that can be utilized in accordance with various aspects described herein.
Figure 5:
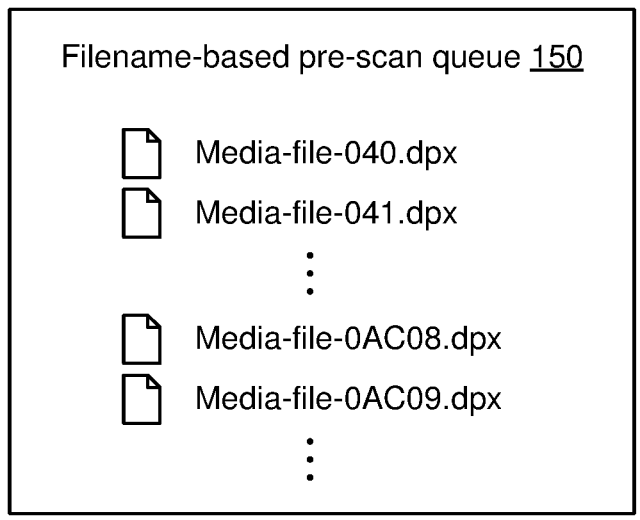
Figure 6:
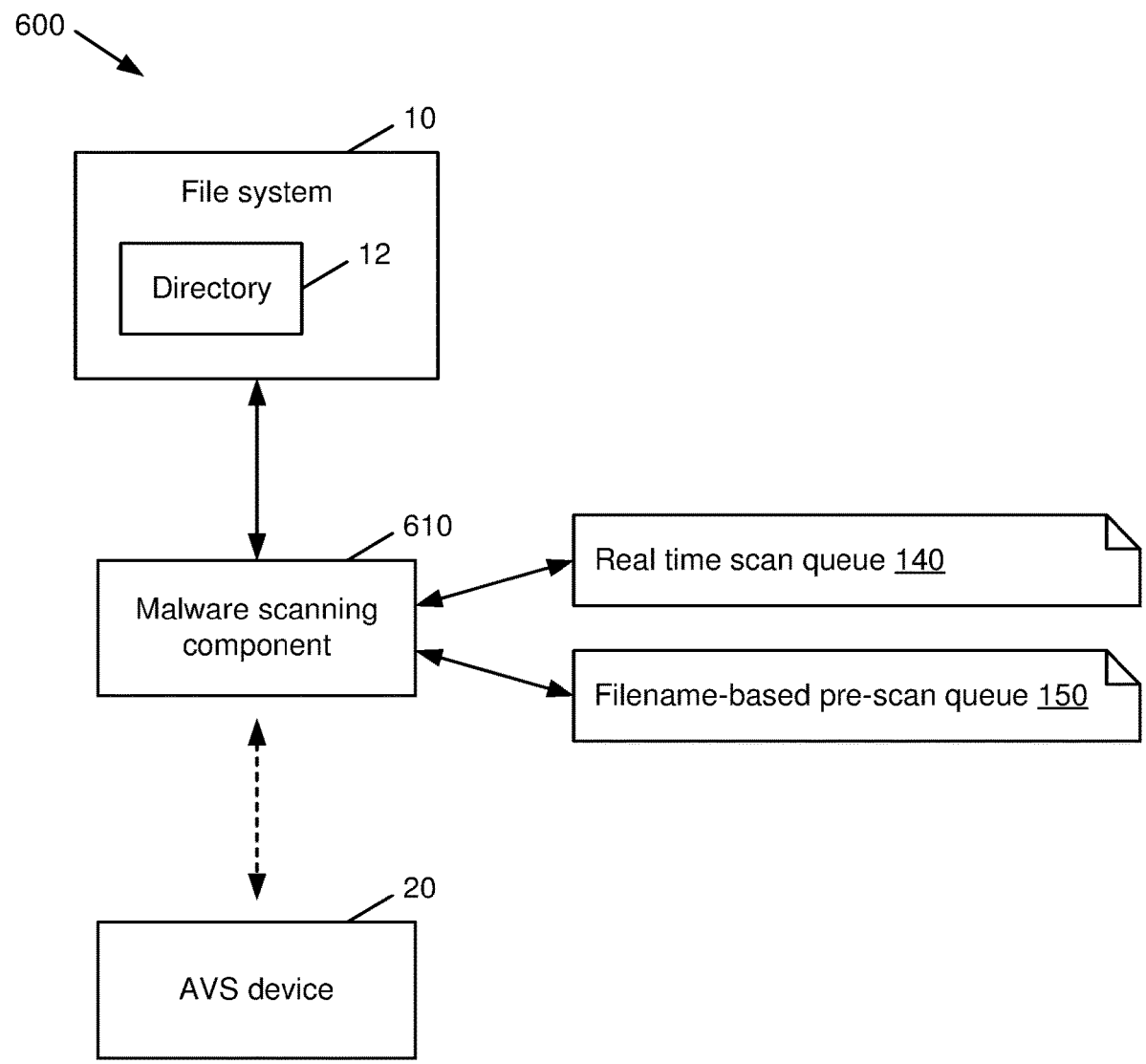
FIG. 6 is a block diagram of a system that facilitates conducting malware scanning according to a group of malware scan queues in accordance with various aspects described herein.

With reference now to FIGS. 4-6, various algorithms for enabling and conducting filename-based malware pre-scanning are shown and described. It should be appreciated that the algorithms shown and described with respect to FIGS. 4-6 can be utilized for a system that utilizes real time scanning according to a Scan on Read/Open policy. While said algorithms can in some cases not be applicable to Scan on Write/Close or Scheduled Scan policies, operation of said algorithms can affect subsequent action on those policies, as will be discussed further below.

Turning to FIG. 4, a flow diagram of a method 400 for identifying files associated with a filename sequence is illustrated. In an aspect, method 400 can be implemented by the scan queue component 120 and/or the pre-scan queue component 130 as shown in FIG. 1 in response to filename-based pre-scanning being enabled for a given directory 12 of a file system 10 by the scan configuration component 210 as shown in FIG. 2.

At 402, a read (open) request for a file F in a given directory 12 of an associated file system 10 can be received (e.g., by the scan initiator component 110 as described above with respect to FIG. 1).

At 404, it is determined whether filename-based pre-scanning has been enabled for the directory 12 (e.g., by the scan configuration component 210). If pre-scanning has not been enabled, method 400 concludes at 406, where file F is processed as normal. Otherwise, method 400 proceeds to 408 where it is further determined whether the name of file F ends with a number (e.g., a decimal number, a hexadecimal number, an octal number, etc.) N. If the name of file F does not end with a number, method 400 can conclude at 406 in a similar manner to that described above at 404.

If the filename of F is determined at 408 to end with a number, method 400 proceeds to 410, where the directory 12 can be searched (e.g., by the pre-scan queue component 130 and/or other suitable system components) for a filename ending with the number N+1. If such a file is found, the filename of that file can be returned for further processing as will be described below.

As described above, the scan queue component 120 and the pre-scan queue component 130 can facilitate the use of multiple malware scan queues, e.g., the real time scan queue 140 and the filename-based pre-scan queue 150, based on filename analysis as performed according to method 400. In an aspect, the real time scan queue 140 and the filename-based pre-scan queue 150 can contain respective file paths to be scanned such that an antivirus server (AVS) and/or other suitable anti-malware system can determine files to be scanned from the respective queues 140, 150.

Specific, non-limiting examples of a real time scan queue 140 and a filename-based pre-scan queue 150 that can be constructed by the scan queue component 120 and the pre-scan queue component 130, respectively, are shown by diagram 500 in FIG. 5. As shown in diagram 500, the real time scan queue 140 can include scan requests corresponding to incoming file read requests from clients and/or other entities. These requests can be processed in a first-in first-out (FIFO) manner.

As further shown by diagram 500, the filename-based pre-scan queue 150 can contain scan requests corresponding to files that are determined to be next to be read by the file examination component, e.g., according to method 400. In an aspect, for respective sequentially-named file read, the next file(s) in the filename sequence can be placed into the filename-based pre-scan queue 150 by the pre-scan queue component 130. For example, diagram 500 illustrates that in response to Media-file-039.dpx being placed into the real time scan queue 140, the next files in the filename sequence, e.g., Media-file-040.dpx, Media-file-041.dpx, etc., can be placed into the filename-based pre-scan queue 150. Similar operations can also be performed for file Media-file-0AC07.dpx as further shown in diagram 500. As additionally shown in diagram 500, non-sequentially named files, such as My-movie-file.avi, being placed into the real time scan queue 140 do not cause additional files to be placed into the filename-based pre-scan queue 150.

Referring now to FIG. 6, a block diagram of a system 600 that facilitates conducting malware scanning according to a group of malware scan queues in accordance with various aspects described herein is illustrated. Repetitive description of like elements employed in other embodiments described herein is omitted for brevity. As shown in FIG. 6, system 600 includes a malware scanning component 610 that can facilitate respective malware scans of files in a directory 12 of a file system 10 that are associated with respective malware scan queues, such as the real time scan queue 140 and the filename-based pre-scan queue 150 shown in FIG. 6. In an aspect, the malware scanning component 610 can facilitate local scanning of respective files, e.g., at a same computer or system that is associated with the file system 10. Alternatively, the malware scanning component 610 can provide information relating to respective files to be scanned, and/or the files themselves, to an external antivirus server (AVS) device 20 and/or other external anti-malware server for scanning.

Figure 7:
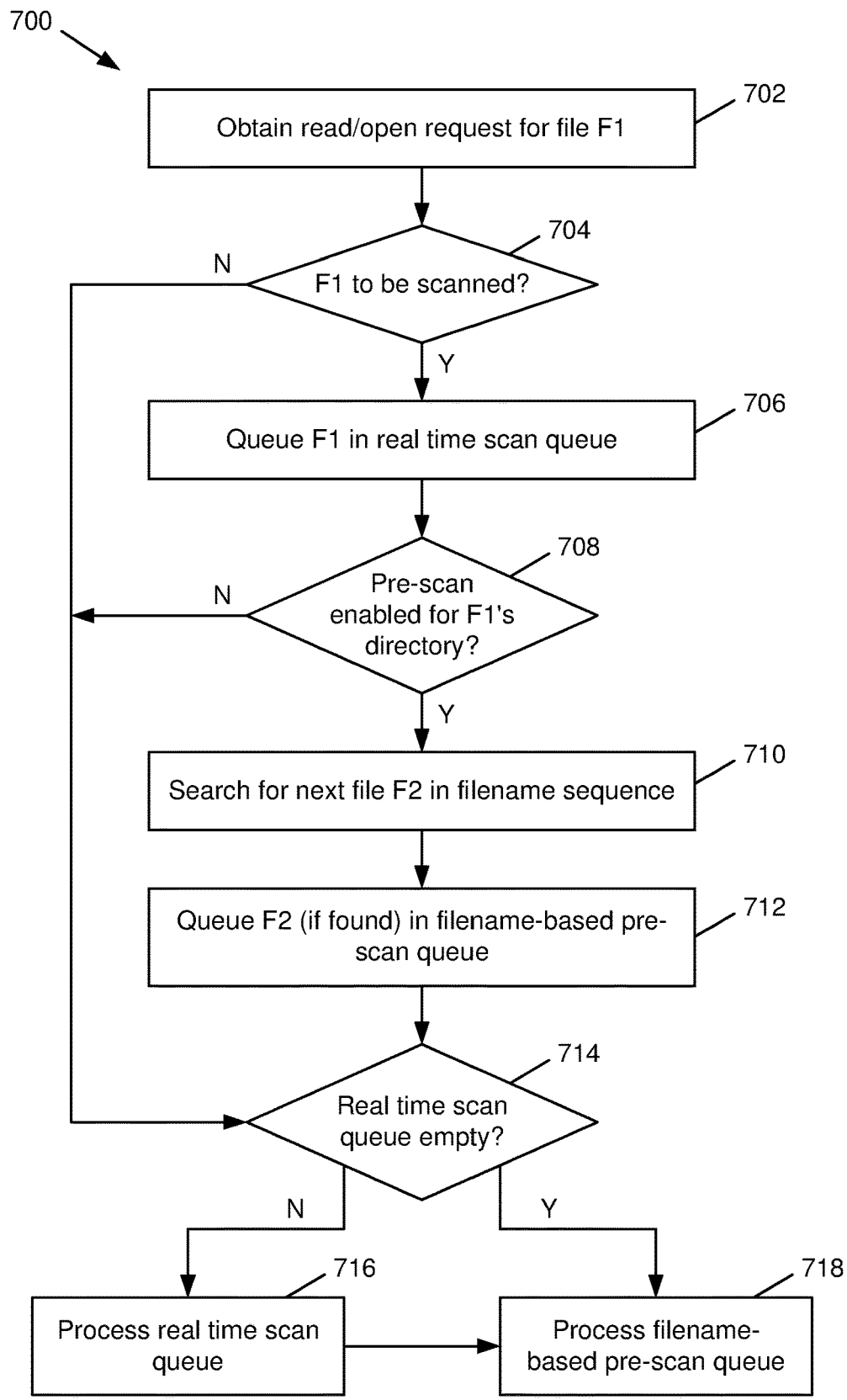
FIG. 7 is a flow diagram of a method for maintaining and utilizing malware scan queues in accordance with various aspects described herein.

In an aspect, the malware scanning component 610 can direct scanning of files in the real time scan queue 140 and the filename-based pre-scan queue 150 such that the real time scan queue 140 is served before the filename-based pre-scan queue 150. In one example, the malware scanning component 610 can prioritize the real time scan queue 140 such that the filename-based pre-scan queue 150 is only processed if the real time scan queue 140 is empty. For instance, FIG. 7 illustrates a flow diagram of an example method 700 that can be utilized by system 600 for processing the real time scan queue 140 and the filename-based pre-scan queue 150 in this manner. Method 700 can begin at 702 by obtaining a read (open) request for a file F1 located in a directory 12 of an associated file system 10.

At 704, it can be determined whether file F1 is to be scanned based on the share configuration of the directory containing F1, a previous scan state of F1, and/or other factors. If a scan for F1 is determined to not be appropriate at 704, method 700 can proceed to 714 to process existing scan queues as will be discussed below. Otherwise, method 700 can proceed to 706, in which file F1 can be added to the real time scan queue 140 (e.g., by the scan queue component 120 in system 100).

In response to queueing a scan request for F1 in the real time scan queue at 706, the directory 12 containing F1 can be read at 708 (e.g., by the scan configuration component 210 in system 200) to determine whether filename-based pre-scanning is enabled for the directory 12. If pre-scanning is not enabled for the directory 12, method 700 can again proceed to 714 to process existing scan queues as will be further discussed below.

If pre-scanning is enabled for the directory 12 containing F1 at 708, method 700 can proceed to 710 to search for a next file F2 in a filename sequence associated with file F1 (e.g., according to method 400 described above with respect to FIG. 4). If file F2 is found, said file can be added to the filename-based pre-scan queue 150 (e.g., by the pre-scan queue component 130 in system 100) at 712. In an aspect, the actions performed at 710 and 712 can be repeated until some or all files in the associated filename sequence are discovered and added to the filename-based pre-scan queue 150.

Following the queueing at 712, or in response to negative determinations at 704 and/or 708, method 700 can proceed to 714 to begin processing of the real time scan queue 140 and the filename-based pre-scan queue 150. As noted above, the real time scan queue 140 can be given priority over the filename-based pre-scan queue 150 such that files in the real time scan queue 140 are processed first. As such, at 714, it can be determined whether the real time scan queue 140 is presently empty. If the real time scan queue 140 is not empty (e.g., scan requests are present in the real time scan queue 140), method 700 can proceed to 716 to process respective scan requests in the real time scan queue 140. After the real time scan queue 140 has been processed at 716, or in response to determining that the real time scan queue 140 is empty at 714, method 700 can conclude at 718 by processing respective scan requests in the filename-based pre-scan queue 150.

Figure 8:
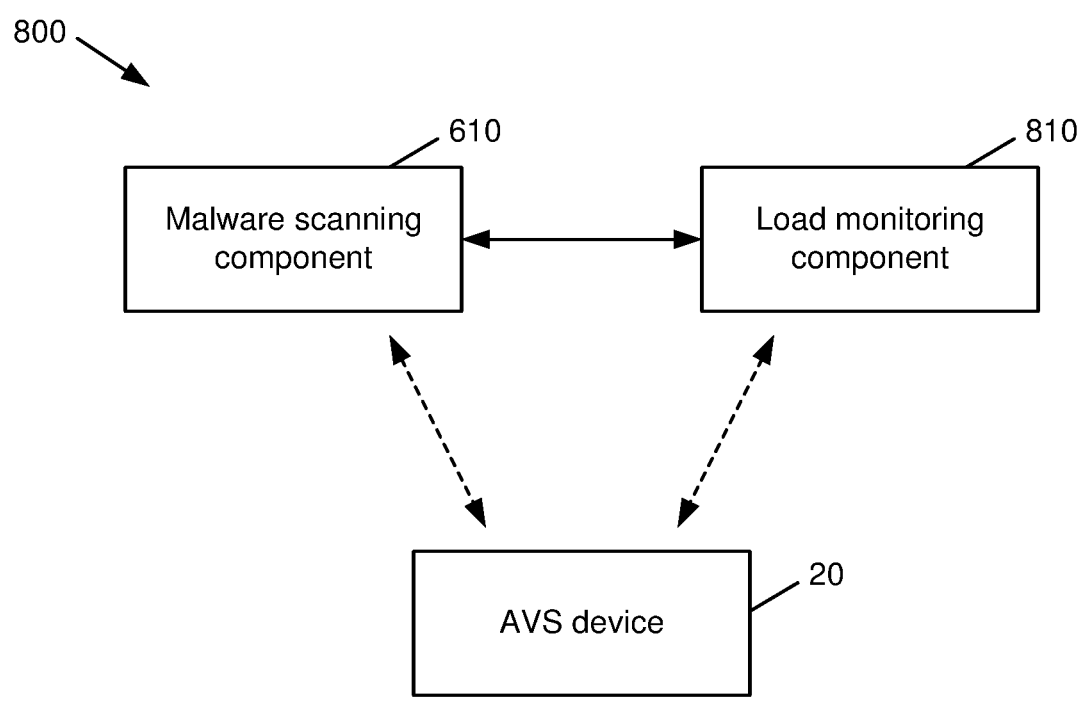
FIG. 8 is a block diagram of a system that facilitates initiation of malware scanning according to server load levels in accordance with various aspects described herein.

As an alternative to prioritizing respective scan requests associated with the real time scan queue 140 over those in the filename-based pre-scan queue 150, the malware scanning component 610 can also facilitate scanning of respective files in one or more of the queues 140, 150 according to a determined loading level of the AVS device 20 and/or other scanning system. For instance, FIG. 8 illustrates a system 800 that facilitates initiation of malware scanning according to server load levels via a load monitoring component 810. Repetitive description of like elements employed in other embodiments described herein is omitted for brevity. In an aspect, the load monitoring component 810 shown in system 800 can monitor a load level of the AVS device 20 and/or other anti-malware server or component(s) utilized for scanning files in system 800. In response to the load monitoring component 810 determining that the load level of the AVS device 20 is below a threshold load level, the malware scanning component 610 can facilitate respective malware scans for files in the real time scan queue 140, the filename-based pre-scan queue 150, or both in any suitable order.

Figure 9:
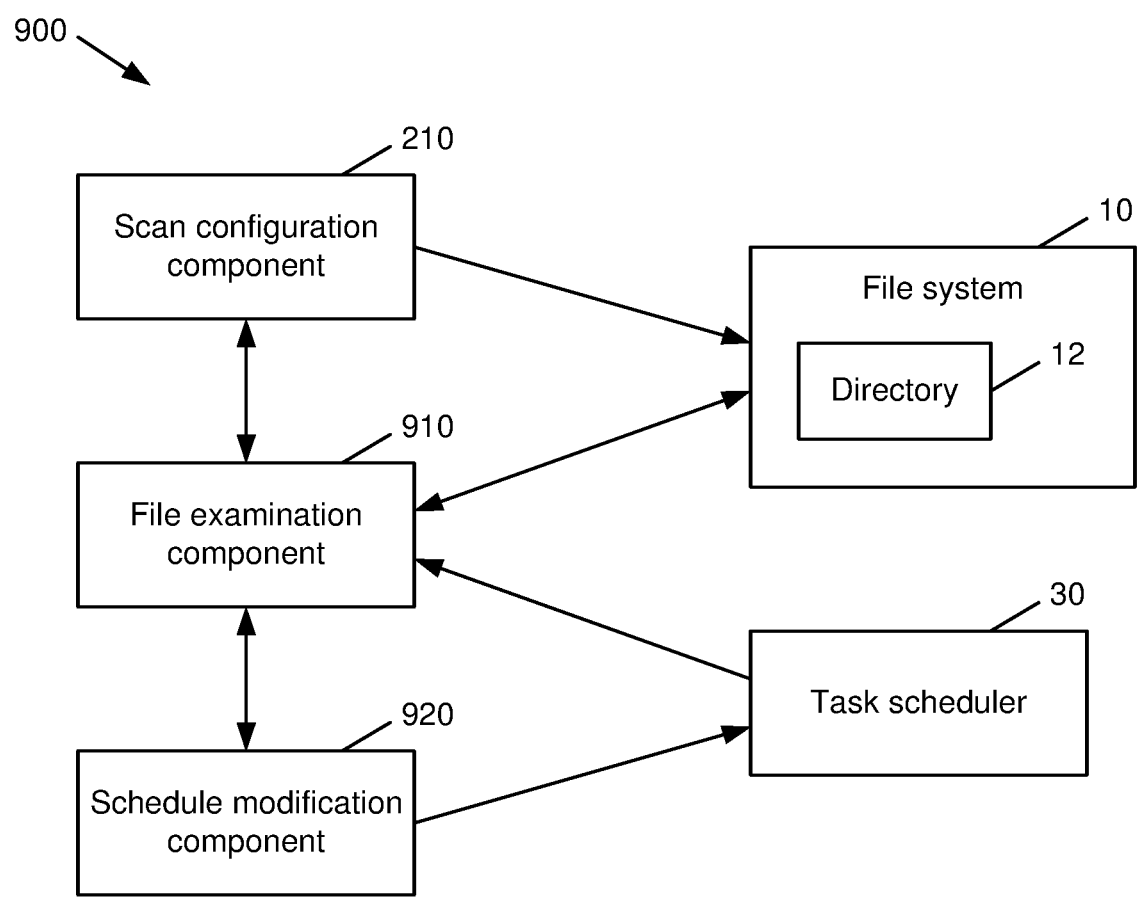
FIG. 9 is a block diagram of a system that facilitates filename-based malware pre-scanning in a data storage system in accordance with various aspects described herein.

Turning now to FIG. 9, a system 900 that facilitates filename-based malware pre-scanning in combination with scheduled malware scanning in accordance with various aspects described herein is illustrated. Repetitive description of like elements employed in other embodiments described herein is omitted for brevity. As shown in FIG. 9, system 900 includes a scan configuration component 210 that can configure a directory 12 of a file system 10 associated with system 900 for sequential malware scanning, e.g., sequential malware scans of respective files in the directory 12 according to filenames of the respective files, in a similar manner to that described above with respect to FIG. 2.

In an aspect, the file system 10 and/or its respective directories 12 can be configured for scheduled malware scans in addition to real time scanning in order to further improve scan throughput. As noted above, if scan on read is enabled for the file system 10 and/or directory 12, file access delays can result while a file to be accessed is scanned for malware. In order to mitigate this delay in some cases, the file system 10 and/or directory 12 can further be configured to scan respective files according to a schedule, e.g., as set by a task scheduler 30, such that respective files can be scanned while they are not being accessed (e.g., during idle periods of the data storage system and/or associated anti-malware systems). As a result, a real time scan can in some cases be omitted when a file that has been scanned according to the scheduled scan policy is subsequently accessed even if a scan on read policy has been set for that file.

As further shown in FIG. 9, system 900 includes a file examination component 910 and a schedule modification component 920 that can further improve the scan throughput of system 900 by modifying a scan schedule as set by the task scheduler 30 based on filename-based malware pre-scanning as described herein. More particularly, the file examination component 910 can compare a last scanned time for a given file in the directory 12 to a scan time threshold associated with a scheduled malware scan task for the directory 12, e.g., as defined by the task scheduler 30. In response to the last scanned time for the file being determined to be later than the scan time threshold, e.g., if a filename-based pre-scan as described herein has occurred within the timeframe associated with the scan schedule set by the task scheduler 30, the schedule modification component 920 can remove the scheduled malware scan task with respect to the file and/or other files in the directory 12 that have filenames in the same filename sequence.

In an aspect, if a directory 12 is determined to contain only sequentially named files, the schedule modification component 920 can determine that all files in the directory 12 have been scanned in response to the file examination component 910 determining that a first file in the directory 12 has been scanned at a time that is later than the scan time threshold. In doing so, the file examination component 910 can avoid crawling the contents of the directory 12, thereby resulting in significantly reduced usage of computing resources (e.g., processor cycles, power consumption, etc.) associated with checking a last scanned time of multiple files in the directory 12.

In an aspect, system 900 and its respective components can operate at different times to facilitate improved malware scan performance as described above. By way of specific, non-limiting examples, FIGS. 10-11 below provide an example of improved scheduled scan performance that can be conducted at the time of a scheduled malware scan task while FIGS. 12-13 below provide another example of improved scheduled scan performance that can be conducted at the time of a real time scan, e.g., prior to a scheduled malware scan task.

Figure 10:
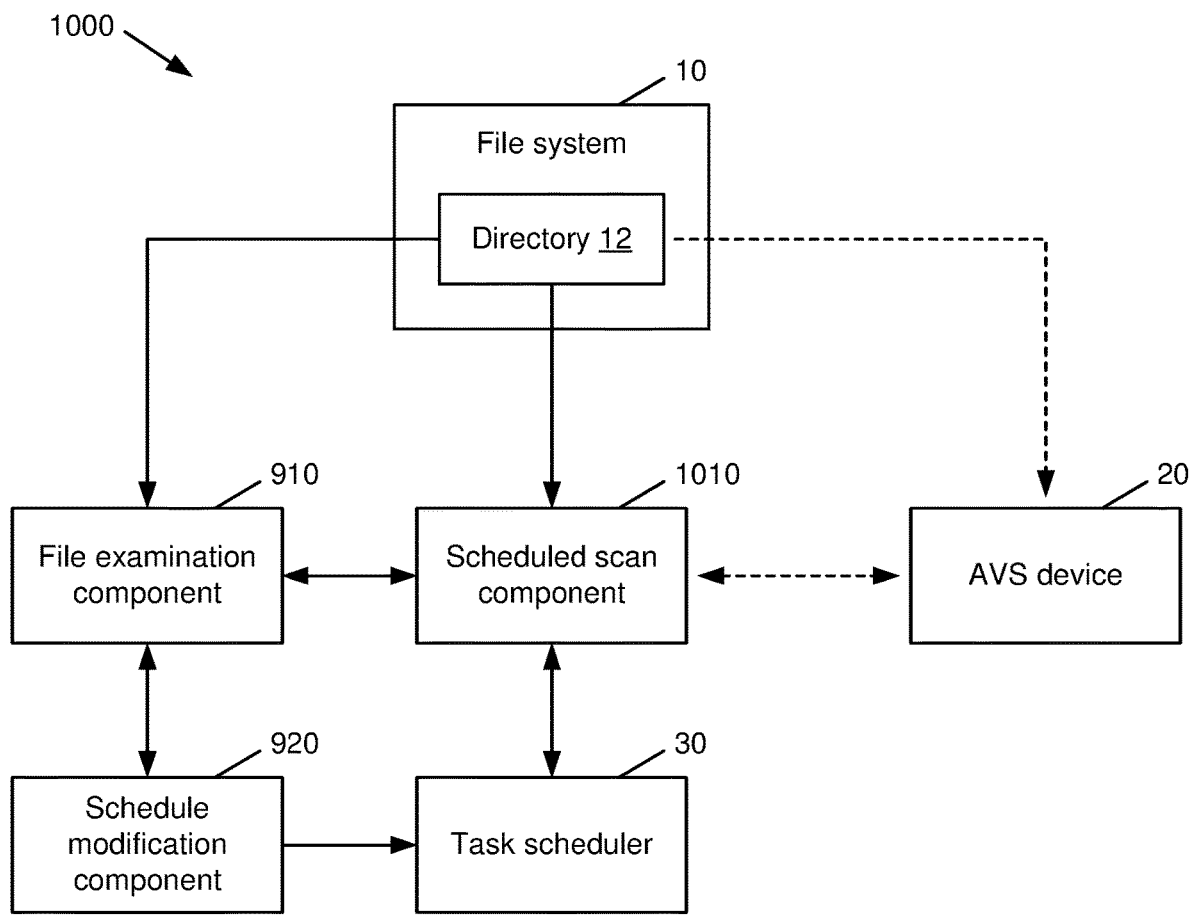
FIG. 10 is a block diagram of a system that facilitates filename-based malware pre-scanning in conjunction with scheduled malware scanning in accordance with various aspects described herein.

With reference now to FIG. 10, a block diagram of a system 1000 that facilitates filename-based malware pre-scanning in conjunction with scheduled malware scanning is illustrated. Repetitive description of like elements employed in other embodiments described herein is omitted for brevity. As shown by FIG. 10, system 1000 includes a scheduled scan component 1010 that can be configured to scan respective files associated with a directory 12 of a file system 10 at a given time, e.g., a time set by the task scheduler 30. As further shown by FIG. 10, the scheduled scan component 1010 can trigger and/or otherwise facilitate operation of the file examination component 910 at a scheduled scan time, e.g., a time associated with a scheduled malware scan task of a given directory 12. If the file examination component 910 determines that the contents of the directory 12 have been previously scanned via a real time scan and associated filename-based malware pre-scanning as described above, the file examination component 910 can, via the schedule modification component 920 and/or the task scheduler 30, cause the scheduled scan component 1010 to skip and/or otherwise discontinue the scheduled scan task. In response, the scheduled scan component 1010 can additionally remove the scheduled scan task by deleting the task from the system, marking the scan task as complete at the task scheduler 30, and/or by other suitable means.

Figure 11:
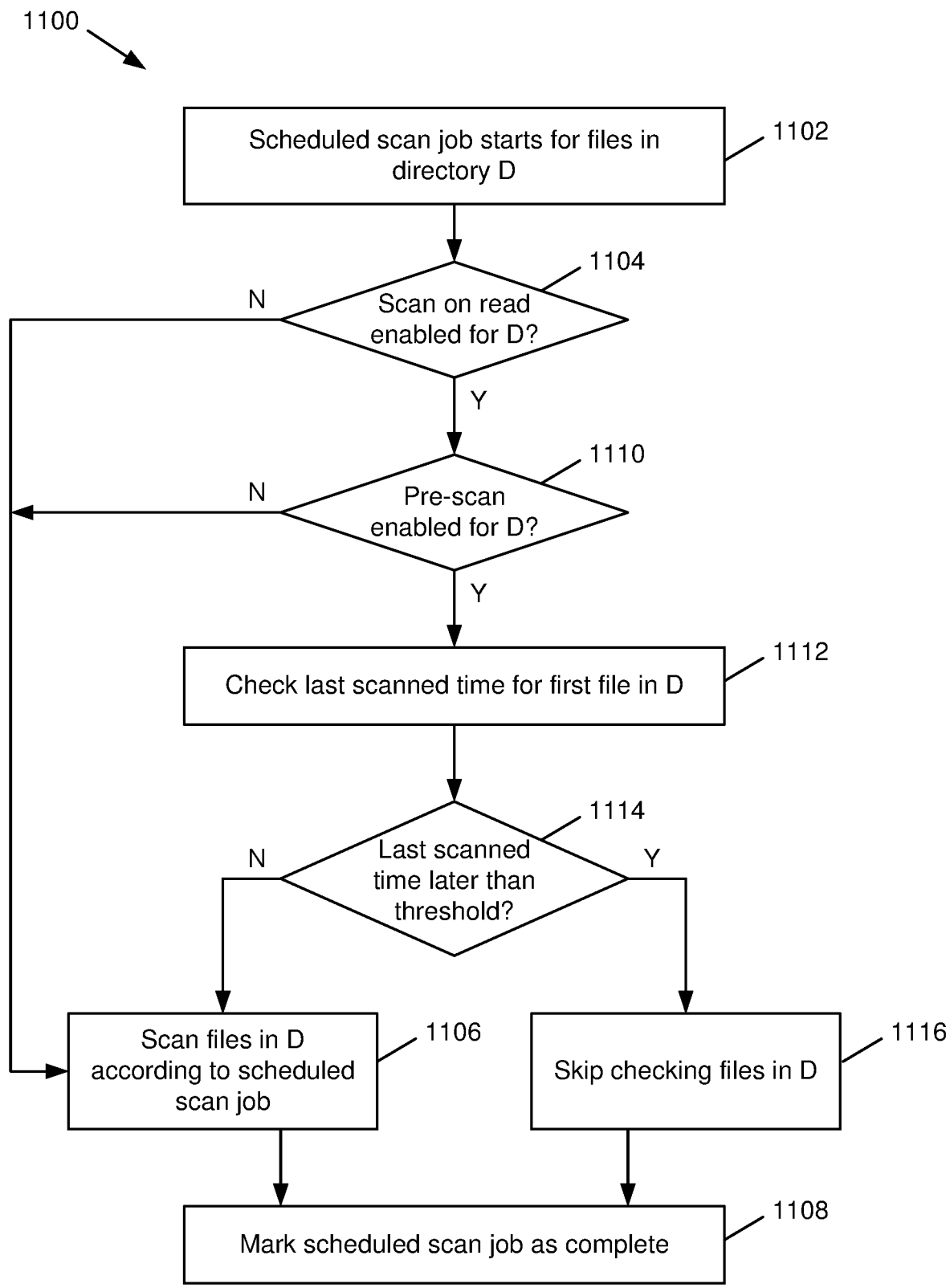
FIG. 11 is a flow diagram of a method for filename-based malware pre-scanning in conjunction with scheduled malware scanning in accordance with various aspects described herein.

Turning to FIG. 11, and with further reference to FIG. 10, a flow diagram of a method 1100 for filename-based malware pre-scanning in conjunction with scheduled malware scanning is presented. At 1102, a scheduled scan job for respective files in a directory D can be initiated, e.g., by the scheduled scan component 1010 according to a schedule set by the task scheduler 30.

From 1102, method 1100 can proceed to 1104 and 1106 to determine whether a scan on read policy and filename-based malware pre-scanning, respectively, have been enabled for directory D, e.g., by the scan configuration component 210. If either scan on read or filename-based malware pre-scanning has not been enabled for directory D, method 1100 can proceed from 1104 and/or 1106 to 1108, wherein the files in directory D can be scanned (e.g., by the scheduled scan component 1010) according to the scheduled scan job. Method 1100 can then conclude at 1110 by marking the scheduled scan job as complete.

Alternatively, if both scan on read and filename-based malware pre-scanning have been enabled for directory D, method 1100 can proceed to 1112 to check (e.g., by the file examination component 910) the last scanned time for a first file in directory D.

At 1114, the last scanned time obtained at 1112 can be compared to a scan time threshold. If the last scanned time for the first file in directory D is determined at 1114 to be older than the threshold, method 1100 can proceed to 1108 as described above to process directory D according to the scheduled scan job. Otherwise, if the last scanned time for the first file in directory D is not older than the threshold, the scheduled scan component 1010 can determine that all files in directory D have been scanned via either a previous real time scan or a filename-based malware pre-scanning technique as described above. As a result, method 1100 can proceed to 1116, wherein the scheduled scan component 1010 can skip checking the remainder of the files in directory D. The scheduled scan component 1010 can then mark the scheduled scan job as successfully completed at 1110 as described above.

Figure 12:
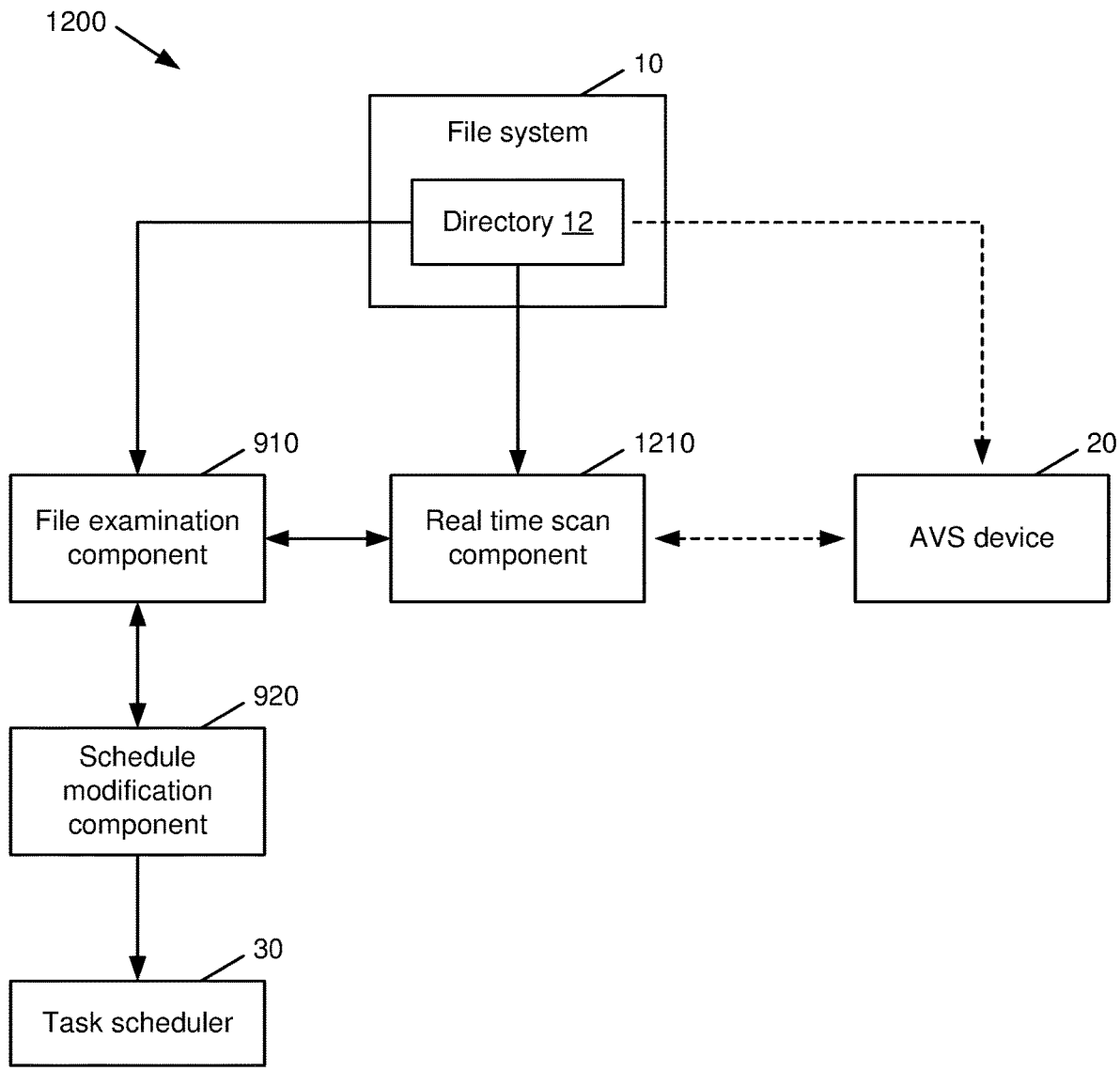
FIG. 12 is a block diagram of a system that facilitates filename-based malware pre-scanning in conjunction with real time malware scanning in accordance with various aspects described herein.

Referring now to FIG. 12, a block diagram of a system 1200 that facilitates filename-based malware pre-scanning in conjunction with real time malware scanning is illustrated. Repetitive description of like elements employed in other embodiments described herein is omitted for brevity. As shown by FIG. 12, system 1200 includes a real time scan component 1210 that can be configured to scan respective files associated with a directory 12 of a file system 10 according to a scan on read policy and/or another suitable real time scan policy. As further shown by FIG. 12, in response to completion of a real time malware scan of a first file in a given directory 12, the real time scan component 1210 can facilitate filename-based malware pre-scanning of respective other files in the directory 12 as described above. Additionally, the real time scan component 1210 can trigger and/or otherwise facilitate operation of the file examination component 910 in response to completion of said real time malware scan. In response, the file examination component 910 can determine whether a scheduled scan job exists for the directory 12 associated with the file that was scanned by the real time scan component 1210. If a scheduled scan job exists for the directory 12, the file examination component 910 can, via the schedule modification component 920 and/or the task scheduler 30, remove the upcoming scheduled scan job by deleting the task from the system, preemptively marking the task as complete at the task scheduler 30, and/or by other suitable means.

Figure 13:
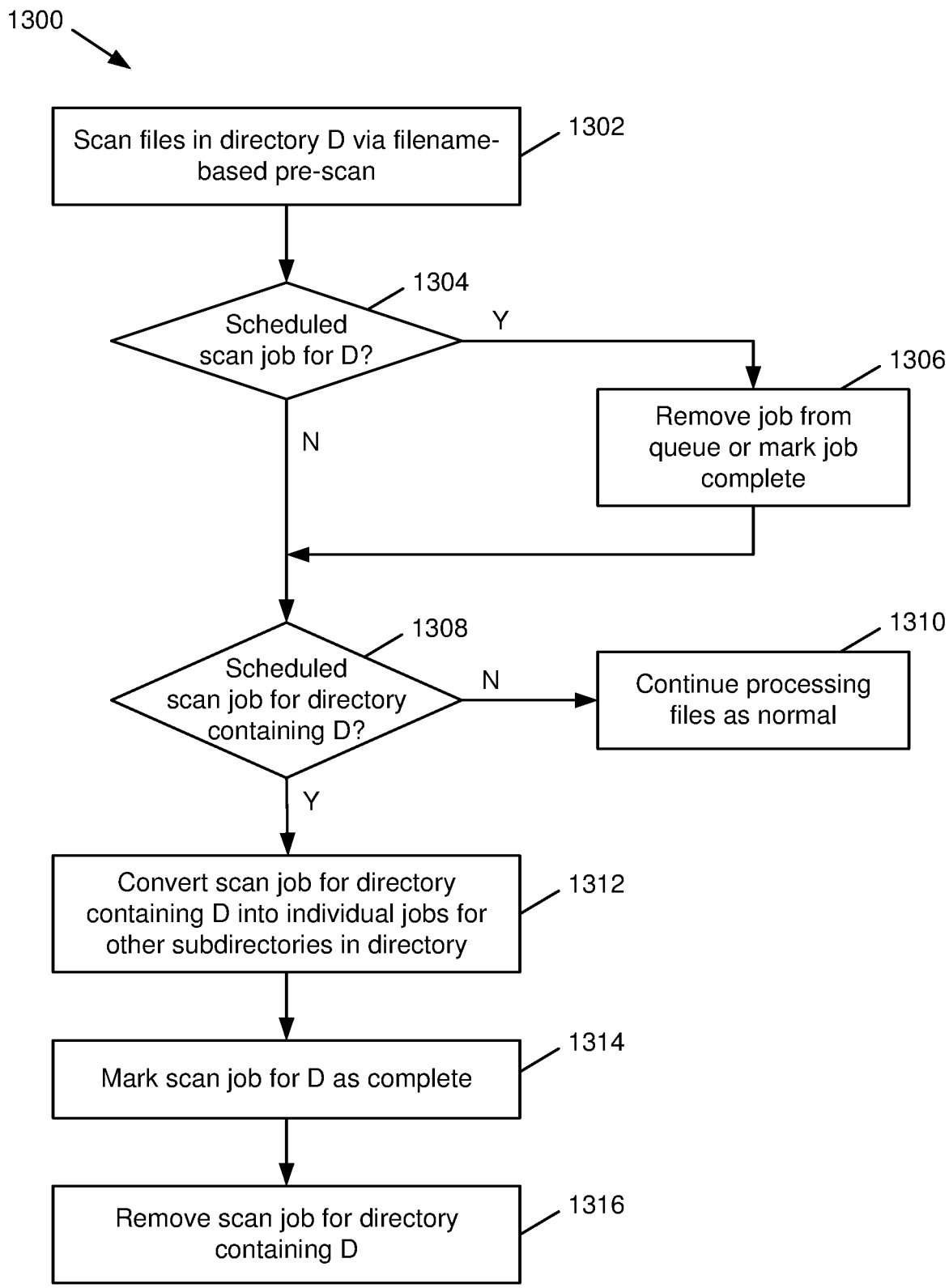
FIG. 13 is a flow diagram of a method for filename-based malware pre-scanning in conjunction with real time malware scanning in accordance with various aspects described herein.

Turning to FIG. 13, and with further reference to FIG. 12, a flow diagram of a method 1300 for filename-based malware pre-scanning in conjunction with real time malware scanning is presented. At 1302, respective files in a directory D can be scanned, e.g., by the real time scan component 1210, according to a real time scan policy and filename-based pre-scanning as described above.

At 1304, it can be determined (e.g., by the file examination component 910 and/or other suitable components) whether a scheduled scan job exists for directory D. If a scheduled scan job exists for directory D, method 1300 can proceed from 1304 to 1306, wherein the scheduled scan job can be removed from the scheduled task queue or marked as complete, e.g., by the schedule modification component 920 via the task scheduler 30.

After removing the scheduled scan job for directory D at 1306, or if no scheduled scan job exists for directory D as determined at 1304, method 1300 can proceed to 1308 to determine whether a scheduled scan job exists for a directory containing D, e.g., a parent directory of D. If a scheduled scan job does not exist for any directory containing D, method 1300 can conclude at 1310, and files can be processed as normal.

Conversely, if a scheduled scan job for a directory containing D exists, method 1300 can proceed to 1312, wherein the scan job for the directory containing D is converted into a group of scan jobs for each subdirectory of the directory containing D, including directory D. Next, at 1314, the scan job created for directory D at 1312 can be removed and/or marked as complete in a similar manner to that described above with respect to 1306. At 1316, the scan job for the directory containing D can then be removed. Stated another way, as a result of the actions performed at 1312, 1314, and 1316, the scan job for the parent directory of D can be removed and replaced with individual scan jobs for the respective subdirectories of that directory excluding directory D.

Figure 14:
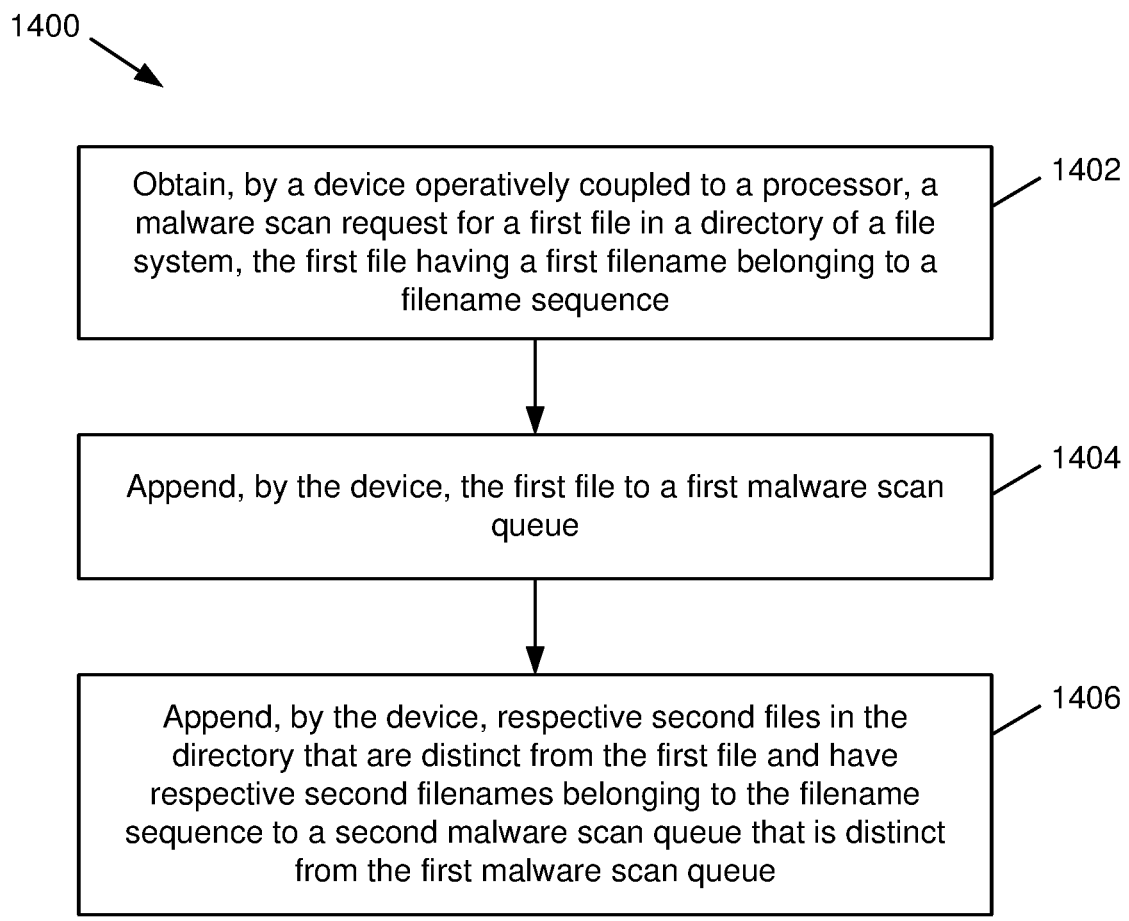
FIGS. 14-15 are flow diagrams of respective methods that facilitate filename-based malware pre-scanning in accordance with various aspects described herein.

Referring next to FIG. 14, a flow diagram of a method 1400 that facilitates filename-based malware pre-scanning in accordance with various aspects described herein is illustrated. At 1402, a device operatively coupled to a processor can obtain (e.g., by a scan initiator component 110) a malware scan request for a first file in a directory of a file system (e.g., a directory 12 of a file system 10). In an aspect, the first file has a first filename that belongs to a filename sequence.

At 1404, the device can append (e.g., by a scan queue component 120) the first file to a first malware scan queue (e.g., a real time scan queue 140).

At 1406, the device can append (e.g., by a pre-scan queue component 130) respective second files in the directory that are distinct from the first file and have second filenames belonging to the filename sequence to a second malware scan queue (e.g., a filename-based pre-scan queue 150) that is distinct from the first malware scan queue to which the first file was appended at 1404.

Figure 15:
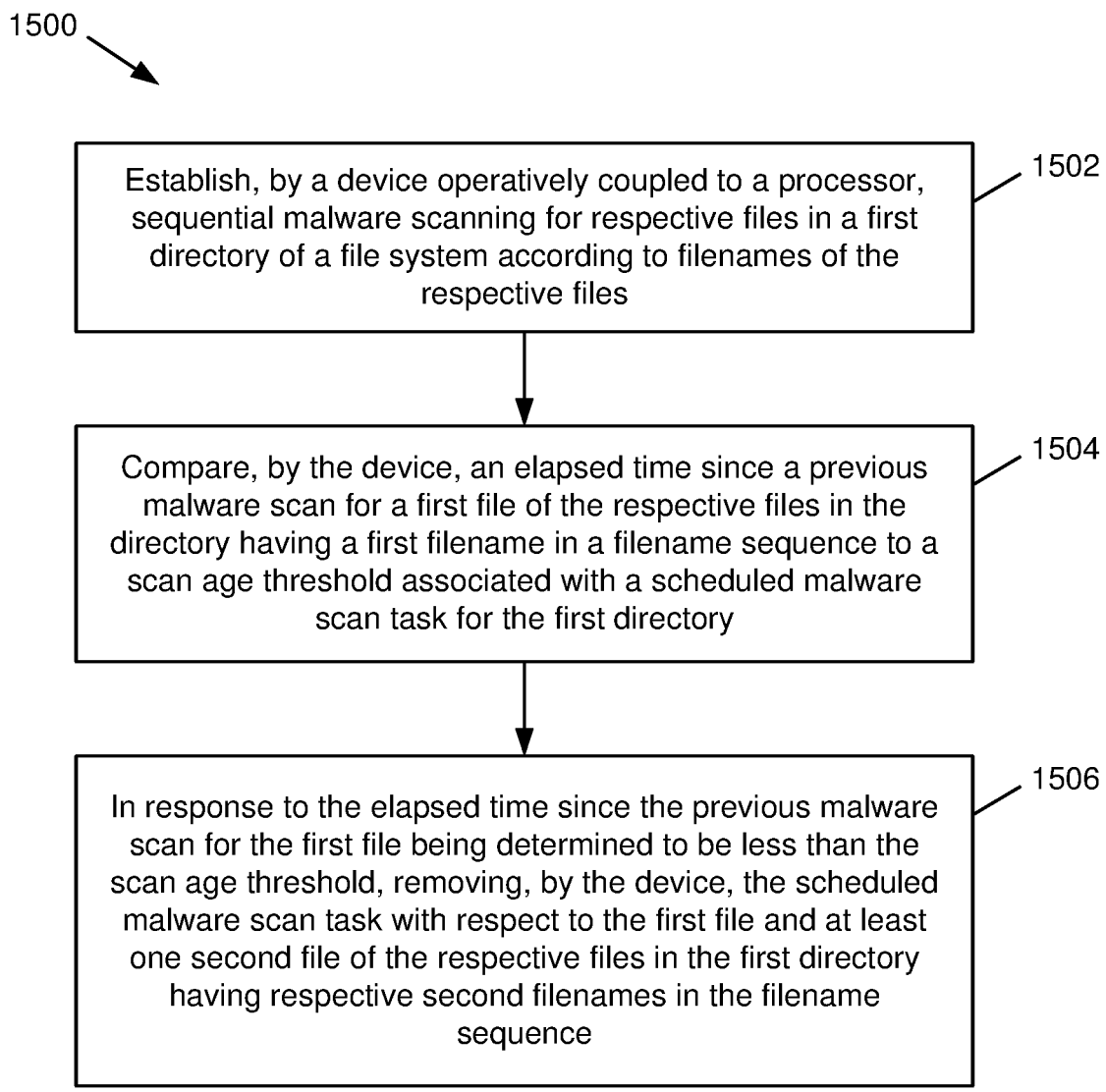

Turning to FIG. 15, a flow diagram of another method 1500 that facilitates filename-based malware pre-scanning in accordance with various aspects described herein is illustrated. At 1502, a device operatively coupled to a processor can establish (e.g., by a scan configuration component 210) sequential malware scanning for respective files in a first directory of a file system (e.g., a directory 12 of a file system 10) according to filenames of the respective files.

At 1504, the device can compare (e.g., by a file examination component 910) an elapsed time since a previous malware scan for a first file of the respective files in the directory having a first filename in a filename sequence to a scan age threshold associated with a scheduled malware scan task for the first directory (e.g., as set by a task scheduler 30).

At 1506, in response to the elapsed time since the previous malware scan for the first file being determined at 1504 to be less than the scan age threshold, the device can remove (e.g., by a schedule modification component 920) the scheduled malware scan task with respect to the first file and at least one second file of the respective files in the first directory having respective second filenames in the filename sequence.

FIGS. 4, 7, 11, and 13-15 as described above illustrate methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 16:
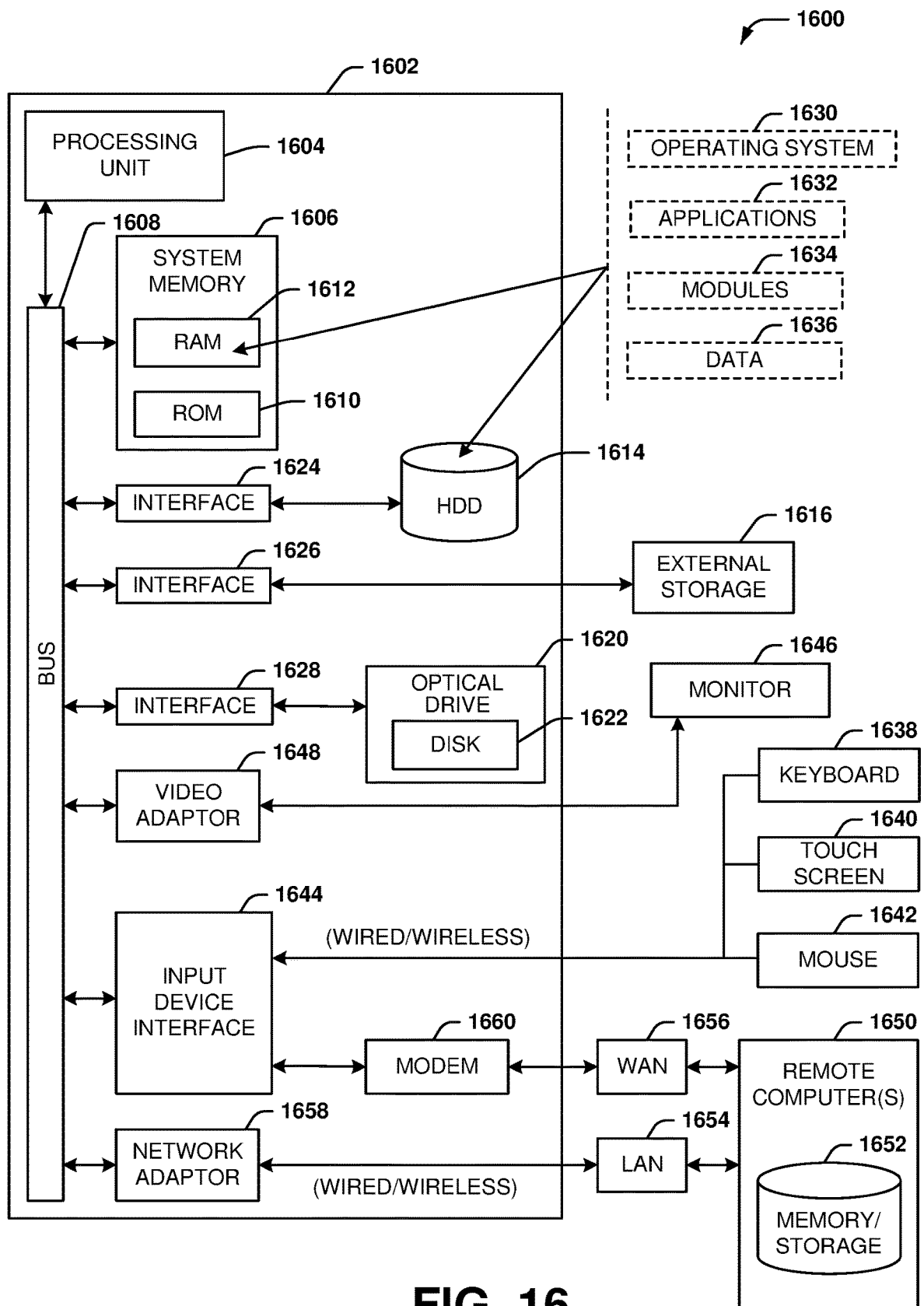
FIG. 16 is a diagram of an example computing environment in which various embodiments described herein can function.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
   a memory that stores computer executable components; and a processor that executes computer executable components stored in the memory, wherein the computer executable components comprise:
  a scan initiator component that receives a malware scan request for a first file in a directory of a file system associated with the data storage system, wherein the first file has a first filename ending with a first number;
  a scan queue component that adds the first file to a first malware scan queue; and
  a pre-scan queue component that locates, in the directory, respective second files, distinct from the first file and having respective second filenames that end with respective second numbers that form a numerical sequence with the first number of the first filename, wherein the pre-scan queue component locates, in the directory, respective third files, distinct from the first file and the second files and having respective third filenames that do not end with the respective second numbers, and adds the respective second files to a second malware scan queue that is distinct from the first malware scan queue without adding the respective third files to the second malware scan queue.

2. The data storage system of claim 1, wherein the computer executable components further comprise:
  a scan configuration component that configures the directory for malware pre-scanning, wherein the pre-scan queue component adds the respective second files in the directory to the second malware scan queue in response to determining that the directory has been configured for the malware pre-scanning by the scan configuration component.

3. The data storage system of claim 2, wherein the scan configuration component configures the directory for the malware pre-scanning in further response to determining that a second filename of the second filenames ends in a second number of the second numbers that is greater than the first number of the first filename by one.

4. The data storage system of claim 2, wherein the scan configuration component configures the directory for the malware pre-scanning in further response to determining that the first filename and the second filenames each comprise a same file extension.

5. The data storage system of claim 1, wherein the numerical sequence is selected from a group comprising a decimal sequence, a hexadecimal sequence, and an octal sequence.

6. The data storage system of claim 1, wherein the computer executable components further comprise:
  a malware scanning component that facilitates respective first malware scans of respective first files in the first malware scan queue and respective second malware scans of respective second files in the second malware scan queue.

7. The data storage system of claim 6, wherein the malware scanning component facilitates the respective second malware scans in response to determining that the first malware scan queue is empty.

8. The data storage system of claim 6, wherein the malware scanning component facilitates the respective first malware scans and the respective second malware scans via an anti-malware server, and wherein the computer executable components further comprise:
  a load monitoring component that monitors a load level of the anti-malware server, wherein the malware scanning component facilitates the respective first malware scans and the respective second malware scans via the anti-malware server in response to the load level of the anti-malware server being determined to be below a threshold load level.

9. The data storage system of claim 1, wherein the malware scan request for the first file is associated with a request by a client system to open the first file.

10. A method, comprising:
  obtaining, by a device operatively coupled to a processor, a malware scan request for a first file in a directory of a file system, the first file having a first filename ending in a first number;
  appending, by the device, the first file to a first malware scan queue;
  identifying, within the directory by the device, respective second files that are distinct from the first file and having respective second filenames that end in respective second numbers that form a numerical sequence with the first number of the first filename;
  identifying, within the directory by the device, respective third files that are distinct from the first file and the second files and having respective third filenames that do not end in the respective second numbers; and
  appending, by the device, the respective second files to a second malware scan queue that is distinct from the first malware scan queue without appending the respective third files to the second malware scan queue.

11. The method of claim 10, further comprising:
  initializing, by the device, the directory for sequential malware scanning, wherein appending the respective second files to the second malware scan queue comprises appending the respective second files to the second malware scan queue in further response to the initializing.

12. The method of claim 9, wherein the numerical sequence is selected from a group comprising a decimal sequence, a hexadecimal sequence, and an octal sequence.

13. The method of claim 9, further comprising:
  directing, by the device, respective first malware scans of respective first files in the first malware scan queue; and
  directing, by the device, respective second malware scans of respective second files in the second malware scan queue.

14. The method of claim 13, wherein directing the respective second malware scans comprises directing the respective second malware scans in response to determining that the first malware scan queue is empty.

15. A non-transitory machine-readable medium comprising computer executable instructions that, when executed by a processor of a data storage system, facilitate performance of operations, the operations comprising:
  receiving a malware scan request for a first file in a directory of a file system of the data storage system, the first file having a first filename ending in a first number;
  queueing the first file in a first malware scan queue;
  locating, in the directory, respective second files that are distinct from the first file and have respective second filenames that end in respective second numbers that form a numerical sequence with the first number of the first filename;
  locating, in the directory, respective third files that are distinct from the first file and the second files and having respective third filenames that do not end in the respective second numbers; and
  queueing the respective second files in a second malware scan queue that is distinct from the first malware scan queue without queueing the respective third files in the second malware scan queue.

16. The non-transitory machine-readable medium of claim 15, wherein the operations further comprise:
configuring the directory for sequential malware scanning, wherein the queueing of the respective second files in the second malware scan queue comprises the queueing of the respective second files in the second malware scan queue in response to the configuring.

17. The non-transitory machine-readable medium of claim 15, wherein the operations further comprise: facilitating respective first malware scans of respective first files in the first malware scan queue; and
facilitating respective second malware scans of respective second files in the second malware scan queue.

18. The non-transitory machine-readable medium of claim 17, wherein the operations further comprise: directing the respective second malware scans in response to determining that the first malware scan queue is empty.

19. The method of claim 11, wherein the first number of the first filename is represented as N, and wherein the initializing comprises initializing the directory for the sequential malware scanning in response to determining that a second filename of the respective second filenames ends in a second number of the second numbers, which is N+1.

20. The non-transitory machine-readable medium of claim 16, wherein the operations further comprise:
initializing the directory for the sequential malware scanning in response to determining that a second filename of the respective second filenames ends with a second number of the second numbers that is one greater than the first number of the first filename.

* * * * *